United States Patent
Bormann et al.

(10) Patent No.: US 12,278,465 B2
(45) Date of Patent: Apr. 15, 2025

(54) PRECHAMBER SPARK PLUG HAVING ACCURATELY ADJUSTABLE ELECTRODE GAP, AND ASSOCIATED METHOD

(71) Applicant: Robert Bosch GmbH, Stuttgart (DE)

(72) Inventors: Axel Bormann, Bamberg (DE); Manfred Roeckelein, Kemmern (DE); Stephan Kaske, Sternenfels Diefenbach (DE); Thomas Steidten, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/550,619

(22) PCT Filed: Mar. 28, 2022

(86) PCT No.: PCT/EP2022/058074
§ 371 (c)(1),
(2) Date: Sep. 14, 2023

(87) PCT Pub. No.: WO2022/228798
PCT Pub. Date: Nov. 3, 2022

(65) Prior Publication Data
US 2024/0170928 A1    May 23, 2024

(30) Foreign Application Priority Data
Apr. 27, 2021   (DE) .................. 10 2021 204 189.2

(51) Int. Cl.
*H01T 13/34* (2006.01)
*H01T 13/54* (2006.01)
*H01T 21/02* (2006.01)

(52) U.S. Cl.
CPC ............. *H01T 13/34* (2013.01); *H01T 13/54* (2013.01); *H01T 21/02* (2013.01)

(58) Field of Classification Search
CPC .......... H01T 13/34; H01T 13/54; H01T 21/02
See application file for complete search history.

(56) References Cited

U.S. PATENT DOCUMENTS 10,714,906 B1 *   7/2020   Ban .................... H01T 13/54

FOREIGN PATENT DOCUMENTS

| DE | 102017221517 A1 | 6/2019 | |
| DE | 102020202701 A1 | 9/2020 | |
| DE | 102020108430 A1 | 10/2020 | |
| DE | 102020204698 A1 | 10/2020 | |
| DE | 102020204745 A1 | 10/2020 | |
| DE | 102019207399 A1 | 11/2020 | |
| JP | 2007005061 A | * 1/2007 | |
| WO | WO-2020233890 A1 | * 11/2020 | ............. H01T 13/34 |

OTHER PUBLICATIONS

International Search Report for PCT/EP2022/058074, Issued Aug. 1, 2022.

* cited by examiner

*Primary Examiner* — Evan P Dzierzynski
*Assistant Examiner* — Nathaniel J Lee
(74) *Attorney, Agent, or Firm* — NORTON ROSE FULBRIGHT US LLP; Gerard A. Messina

(57) ABSTRACT

A prechamber spark plug. The prechamber spark plug includes a central electrode and a ground electrode which are arranged in a prechamber, and a housing having a lateral hole, the ground electrode being arranged in the lateral hole in such a way that there is a gap area and a fastening area between the ground electrode and the housing.

14 Claims, 3 Drawing Sheets

PRECHAMBER SPARK PLUG HAVING ACCURATELY ADJUSTABLE ELECTRODE GAP, AND ASSOCIATED METHOD

FIELD

The present invention relates to a prechamber spark plug having an accurately adjustable electrode spacing between a central electrode and a ground electrode, and to a method for adjusting an accurate electrode spacing between a ground electrode and a central electrode of the prechamber spark plug.

BACKGROUND INFORMATION

A variety of embodiments of prechamber spark plugs are described in the related art. In the related art, until now prechamber spark plugs have been used primarily for stationary gas engines which typically only run at a single operating point under a relatively high load. The respective prechamber spark plugs are then configured for this operating point. However, for mobile internal combustion engines, for example for vehicles, ignition must also be ensured, under a wide variety of load ranges, in particular even in partial load ranges. Accurate maintenance of an electrode spacing between a central electrode and a ground electrode is necessary in this case. Furthermore, in the case of prechamber spark plugs for vehicles, they must be manufacturable as mass-produced components. Prechamber spark plugs produced until now for stationary gas engines are manufactured in small batches, but this leads to very high costs. Thus, there is the need to be able to mass-produce prechamber spark plugs for use in mobile internal combustion engines for vehicles.

SUMMARY

A prechamber spark plug according to the present invention may have the advantage that an electrode spacing between a central electrode and a ground electrode can be accurately adjusted. The adjusting procedure for the electrode spacing is also suitable for a mass production of the prechamber spark plug. This allows the manufacturing costs for the prechamber spark plug according to the present invention to be significantly reduced so that the prechamber spark plug is in particular suitable for internal combustion engines for vehicles. In particular, the cap and housing of the prechamber spark plug can be designed as a single component without a weld seam. According to the present invention, this is achieved in that the prechamber spark plug comprises a central electrode and a ground electrode, which are arranged in a prechamber. Here, the ground electrode is arranged in a lateral hole in a housing. In this case, there is a gap area and a sealing fastening area between the lateral hole and the ground electrode.

Preferred embodiments of the present invention are disclosed herein.

According to an example embodiment of the present invention, the gap area between the ground electrode and the lateral hole is preferably a clearance fit.

According to an example embodiment of the present invention, the fastening area between the ground electrode and the lateral hole is preferably a weld joint. More preferably, the fastening area is arranged radially further outward than the gap area and is preferably formed on an outer side of the prechamber spark plug between the outer wall of the housing and the rear face of the ground electrode.

More preferably, the ground electrode is arranged at a 90° angle relative to the central electrode.

According to an example embodiment of the present invention, the ground electrode is preferably cylindrical. Particularly preferably, the ground electrode is a polygon, in particular a triangle or a square or a pentagon or a hexagon. In particular, if the ground electrode is designed as a polygon, twisting of the ground electrode when adjusting the electrode spacing can be avoided. A particularly precise adjustment of the electrode spacing between the central electrode and the ground electrode can thus be achieved.

More preferably, according to an example embodiment of the present invention, the housing has a surface, in particular on an outer side of the housing, that has a very low maximum roughness depth $R_{max}$. The roughness depth $R_{max}$ is ≤10 µm here. In particular, during the method for adjusting the electrode spacing, a bell or other sealing component can be securely, and in a sealing manner, placed on the outside of the housing.

According to an example embodiment of the present invention, preferably, a cap and the housing are formed in a single piece. That is to say, the cap no longer has to be fastened separately to the housing, but rather the cap and the housing form a common component. In this way, there is no need for a weld joint or some other type of connection between the cap and the housing.

The present invention further relates to a method for adjusting an electrode spacing between a central electrode and a ground electrode during manufacture of the prechamber spark plug. According to an example embodiment of the present invention, the method comprises the steps of arranging the ground electrode in a lateral hole in a housing of the prechamber spark plug such that the ground electrode is arranged freely movably in the lateral hole. In this case, a clearance fit is preferably formed between the ground electrode and the lateral hole. In a next step, the ground electrode is positioned at a predefined electrode spacing relative to the fixed central electrode. This is possible because the ground electrode is arranged movably within the lateral hole. In a final step, after adjusting the predefined electrode spacing, the ground electrode is fastened to the housing so that the predefined electrode spacing between the central electrode and the ground electrode is maintained. This ends the accurate spacing procedure between the central electrode and the ground electrode. Furthermore, the method according to the present invention offers the possibility of adjusting the electrode spacing with the prechamber cap already assembled, i.e., with the spark plug fully assembled. This results in new design possibilities—for example designing the cap and the housing as one component (without a weld seam).

According to an example embodiment of the present invention, fastening the ground electrode to the housing at the correct electrode spacing is preferably done using a weld joint. Particularly preferably, the weld joint is formed on the outside of the prechamber spark plug between the housing and the ground electrode. The weld joint is more preferably produced using a laser.

According to an example embodiment of the present invention, an especially simple and inexpensive manufacturability is ensured when, after insertion of the ground electrode into the lateral hole in the housing, the prechamber spark plug is brought to a position such that, due to gravity, the ground electrode moves downward and contacts the central electrode. Starting from this state of contact between the ground electrode and the central electrode, the ground electrode is then moved radially outward away from the central electrode until the desired defined electrode spacing is in effect. The ground electrode is then fastened to the housing.

According to an example embodiment of the present invention, the process of moving the ground electrode away from the central electrode is particularly preferably performed by pneumatic pressure. For this purpose, it is preferable that the prechamber of the prechamber spark plug is pressurized so that, due to the increasing pressure, the ground electrode in the lateral hole moves away from the central electrode. When the ground electrode has traveled a predefined path and, for example, its rear face is slowly pushed out of the lateral hole on the outside of the housing, the pushed out path length of the ground electrode can be measured, and from this value the electrode spacing between the central electrode and the ground electrode, which were previously in contact, can be deduced. When the desired electrode spacing is achieved, the ground electrode can then be fastened to the housing.

In this regard, the ground electrode is preferably cylindrical or, particularly preferably, designed as a polygon. In particular, the use of a ground electrode with a polygonal shape has the advantage that twisting during pressurization of the ground electrode from inside the prechamber can be prevented. To be able to securely attach a bell or the like to the prechamber spark plug in order to pressurize the prechamber, a maximum roughness depth $R_{max}$ is preferred to be very small at the wall areas of the housing, in particular ≤10 μm.

It should be further noted that adjusting the electrode spacing between the central electrode and the ground electrode can be carried out as the last step in the manufacture of the prechamber spark plug, i.e., a cap is already fastened to the housing. Alternatively, adjusting the electrode spacing can also be performed before fastening a cap to the housing, and the cap can then be placed on the housing in a further step after the ground electrode has been fastened to the housing at the correct electrode spacing.

According to an example embodiment of the present invention, it is preferable for a cap to be fastened to the housing before adjusting the electrode spacing, in particular using a weld joint or a pressed joint. This allows the final step to be to adjust the electrode spacing. This prevents any thermal warpage of the electrode spacing from occurring when a cap is later fastened to a housing. Alternatively, the cap and housing are designed together in one piece, thereby achieving cost advantages in the manufacture of the prechamber spark plug.

BRIEF DESCRIPTION OF THE DRAWINGS

Preferred exemplary embodiments of the present invention are described in detail below with reference to the figures.

DETAILED DESCRIPTION OF EXAMPLE EMBODIMENTS

Referring to FIGS. 1 to 5, a prechamber spark plug 1 and a method for adjusting an electrode spacing between a central electrode 2 and a ground electrode 3 according to a first exemplary embodiment are described in detail below.

The prechamber spark plug 1 is particularly suitable for mobile internal combustion engines.

Figure 1:
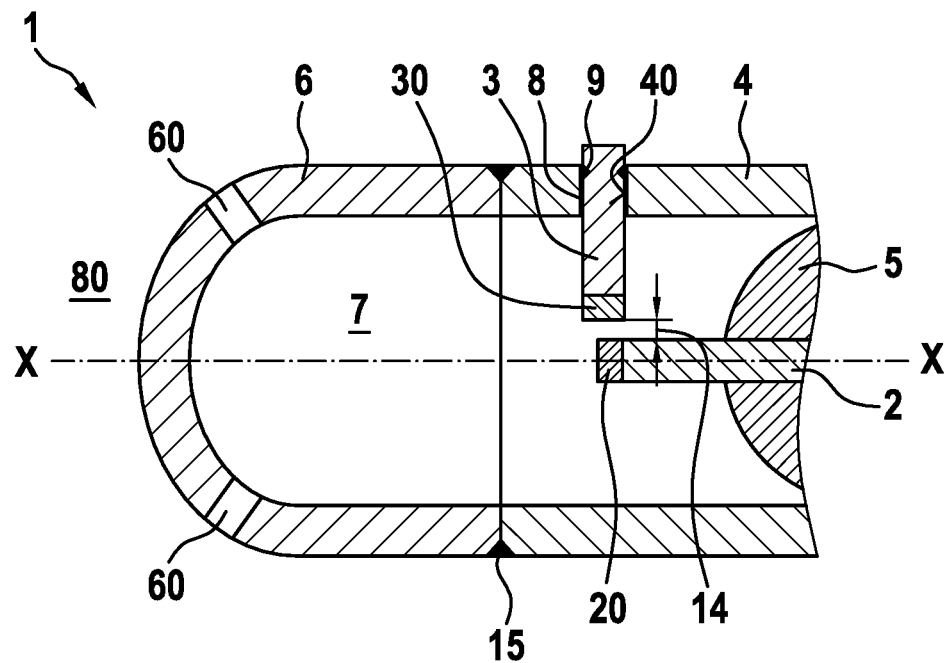
FIG. 1 shows a schematic sectional view of a prechamber spark plug according to a first preferred exemplary embodiment of the present invention.

As can be seen from FIG. 1, the prechamber spark plug 1 comprises a central electrode 2 and a lateral ground electrode 3. The ground electrode 3 is arranged at a 90° angle relative to the central electrode 2. The central electrode 2 runs along a center axis X-X of the prechamber spark plug 1. The central electrode 2 is arranged at least partially in an insulator 5. The insulator 5 serves to electrically isolate the central electrode 2 from the housing 4.

The prechamber spark plug 1 further comprises a housing 4 with a lateral hole 40 in which the ground electrode 3 is arranged.

Here, the housing 4 and a cap 6 define a prechamber 7 of the prechamber spark plug.

As further seen in FIG. 1, the cap 6 comprises a plurality of cap holes 60 designed for a fluid connection between the prechamber 7 and a combustion chamber 80 of an internal combustion engine.

Also, a fastening area 9 and a gap area 8 are designed between the lateral hole 40 and the ground electrode 3. Here, the fastening area 9 is a weld joint between a rear face of the ground electrode and the housing 4.

As further shown in FIG. 1, there is an electrode spacing 14 between the central electrode 2 and the ground electrode 3. The electrode spacing 14 is the shortest connection between the central electrode 2 and the ground electrode 3.

As can be further seen from FIG. 1, the central electrode 2 has a precious metal pin 20 on its front face and the ground electrode 3 has a precious metal pin 30 on its front face. As such, the electrode spacing 14 is the spacing between the two precious metal pins 20, 30.

The ground electrode 3 is designed as a polygon here, but can also be cylindrical.

The method according to the present invention for adjusting an electrode spacing 14 between the central electrode 2 and the ground electrode 3 is described in detail with reference to FIGS. 2 to 5.

Figure 2:
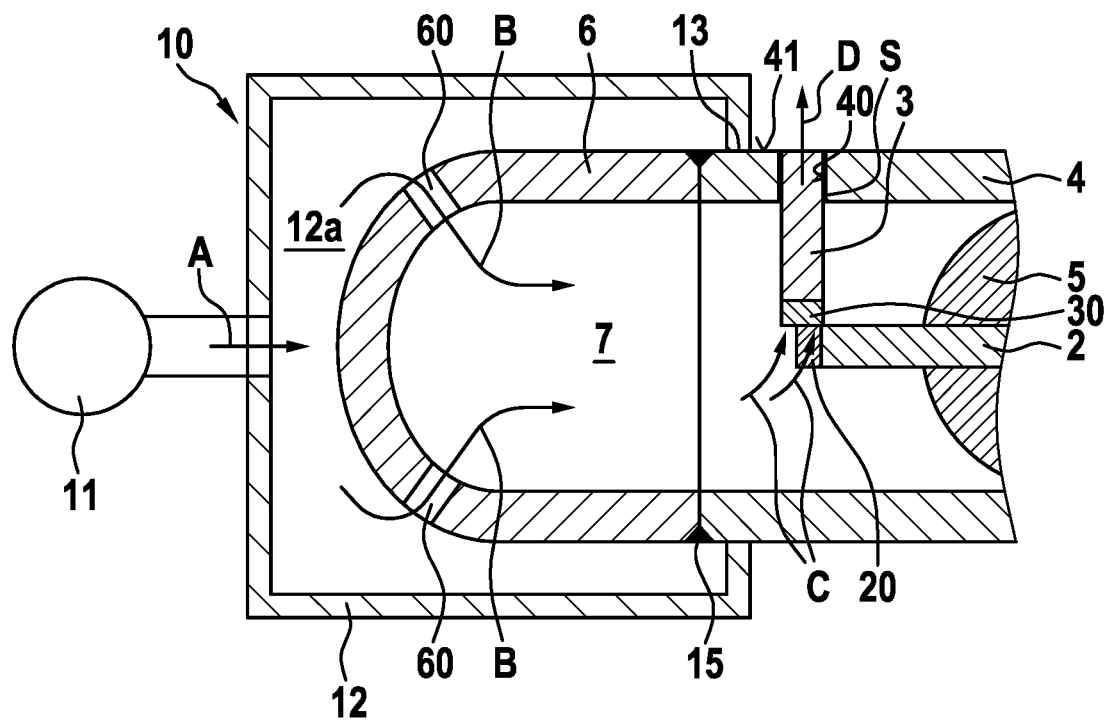
FIG. 2 shows a schematic sectional view illustrating the method for adjusting an electrode spacing between the central electrode and the ground electrode of FIG. 1.

As can be seen from FIG. 2, which shows a structure for carrying out the method, the adjusting of the electrode spacing 14 is carried out using a pneumatic pressure generation unit 10. The pressure generation unit 10 comprises a pressure generator 11, for example a compressor, as well as a bell 12. The bell 12 is arranged in a sealing manner on a sealing region 13 on an outer side 41 of the housing 4 or the cap 6. This results in a sealed space substantially on the outside of the cap 6 as well as the prechamber 7.

In this exemplary embodiment, the cap 6 is fastened to the housing 4 using a weld joint 15. Alternatively, the cap is integrated directly into the housing. The ground electrode 3 is cylindrical here and is arranged in the lateral hole 40 with clearance S. This clearance S ensures the presence of the gap region 8 between the ground electrode 3 and the housing 4 after the prechamber spark plug has been manufactured.

In this embodiment, the accurate adjustment of the electrode spacing 14 between the central electrode 2 and the ground electrode 3 is the final step in the manufacture of the prechamber spark plug.

Figure 3:
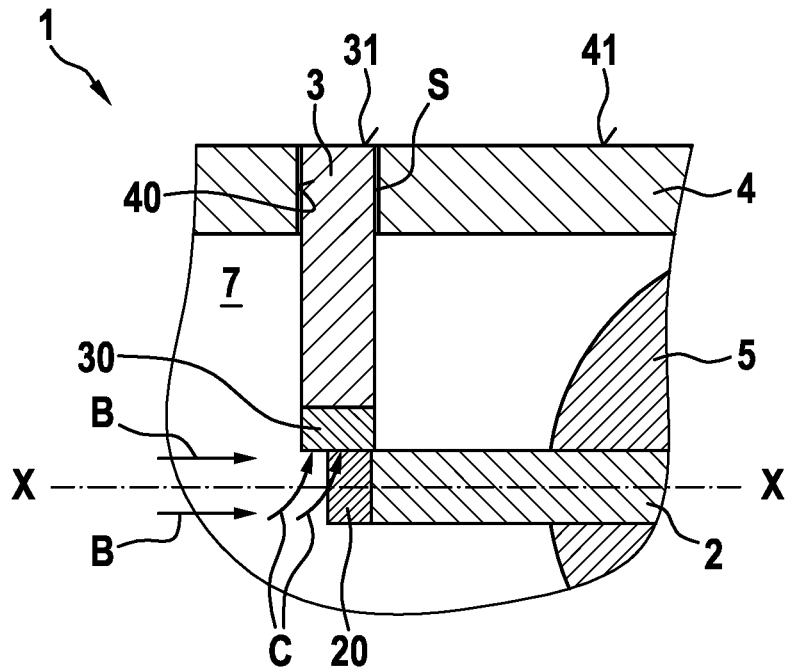
FIGS. 3 to 5 show schematic partial sectional views illustrating the method according to the present invention for adjusting the electrode spacing of the prechamber spark plug of FIG. 1.
Figure 4:
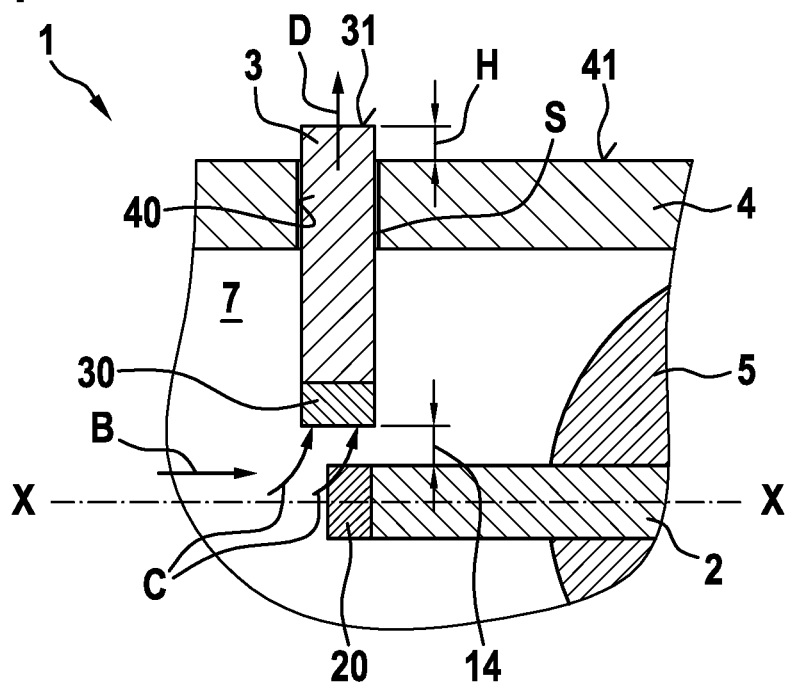

As will become clear from FIGS. 2 and 3, to adjust the electrode spacing 14 according to the method according to the present invention, first a pneumatic pressure is generated using the pressure generator 11. As indicated in FIG. 2 by arrow A, this pressure is applied to the interior region 12a of the bell 12 of the pressure generation unit 10. Because the bell 12 is arranged in a sealing manner on the outer side 41 of the housing 4, the pressure is further applied in the prechamber 7 via the cap holes 60 as indicated in FIG. 2 by arrows B.

Here, the ground electrode 3, which is arranged loosely in the lateral hole 40, contacts the central electrode 2 because the prechamber spark plug 1, which is not yet quite finished in its manufacture, is arranged such that the ground electrode 3 is guided downward by gravity until it comes into contact with the central electrode 2. This position is shown in FIGS. 2 and 3.

Due to the increasing pneumatic pressure within the prechamber 7, which is significantly higher than the ambient pressure prevailing on the outside of the prechamber spark plug, the pressure is also applied to the front face, more precisely the front face of the precious metal pin 30, of the ground electrode 3. This is indicated in FIGS. 2 and 3 by arrows C.

Since the ground electrode 3 is arranged in the lateral hole 40 via a clearance fit S, the ground electrode 3 now moves radially outward due to the prevailing pressure differential. This can also be seen in detail in FIG. 4 (arrow D). A rear face 31 of the ground electrode 3 moves out of the lateral hole 40, indicated in FIG. 4 by the spacing H. In this embodiment, this spacing H corresponds to the electrode spacing 14 between the central electrode 2 and the ground electrode 3 since in this embodiment the rear face 31 of the ground electrode 3 was flush with the outer side 41 of the housing 4 when the central electrode 2 and ground electrode 3 were in contact.

Figure 5:
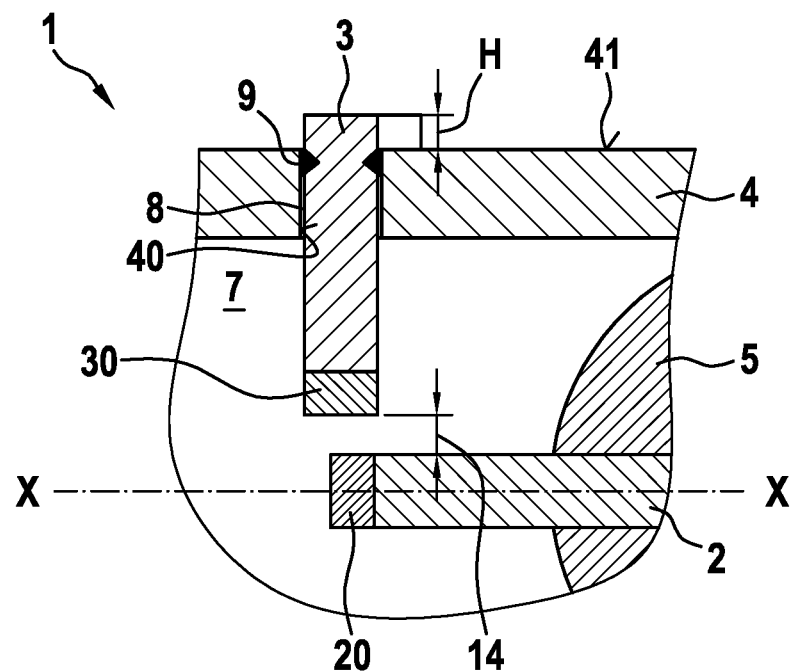

Thus, the electrode spacing 14 may be easily ascertained from outside the prechamber spark plug by measuring the spacing H between the rear face 31 of the ground electrode as it moves out of the housing to the outer side 41 of the housing. When the spacing H corresponds to the desired electrode spacing 14 between central electrode 2 and ground electrode 3, the ground electrode 3 is then fastened in this position. Here, a weld joint is made between the ground electrode 3 and the housing 4 from outside of the prechamber spark plug, the joint then forming the fastening area 9 in the lateral hole 40 between the ground electrode 3 and the housing 4. This is shown in FIG. 5.

Since the rear face 31 of the ground electrode 3 was flush in the initial state in which the ground electrode 3 contacted the central electrode 2, the spacing H corresponds to the electrode spacing 14. It should be noted that in the initial state, the ground electrode may be sunk into the housing or may protrude out above it. In this case the gap area 8 between the ground electrode 3 and the housing 4, which created the clearance fit S between the ground electrode 3 and the housing 4 during the adjustment of the electrode spacing, stays within the lateral hole 40 radially inside of the fastening area 9.

Thus, the present invention has the advantage that the electrode spacing 14 is very accurately adjustable. A simple measurement of the electrode spacing 14 may be made from an outer side of the prechamber spark plug.

It should be noted that the rear face 31 of the ground electrode 3 need not terminate flush with the outer side 41 in the state of contact with the central electrode 2. It is also possible for the rear face to already protrude out somewhat from the lateral hole 40 in the state of contact between the ground electrode 3 and the central electrode 2. This outward protrusion may also be measured in a straightforward manner, the electrode spacing adjustment according to the present invention then being done based on this protrusion. Of course, this means that two measuring operations must be performed on the ground electrode 3; however, since this can be carried out from the outside of the prechamber spark plug, this is possible in a simple manner.

Thus, the method according to the present invention for adjusting the electrode spacing 14 is also suitable for mass production, such that the prechamber spark plug 1 can also be used in mobile internal combustion engines, which are produced in high numbers.

Another great advantage of the method according to the present invention is that the fastening of the ground electrode 3 can be carried out as a last step in the manufacture of the prechamber spark plug. It is thus no longer necessary to weld the cap onto the housing 4 after adjusting the electrode spacing, for example. This can prevent the welding heat that occurs when the cap 6 is fastened to the housing 4 from affecting the electrode spacing 14. According to the present invention, it can thus be ensured that the electrode spacing 14 has accurately the desired spacing.

Figure 6:
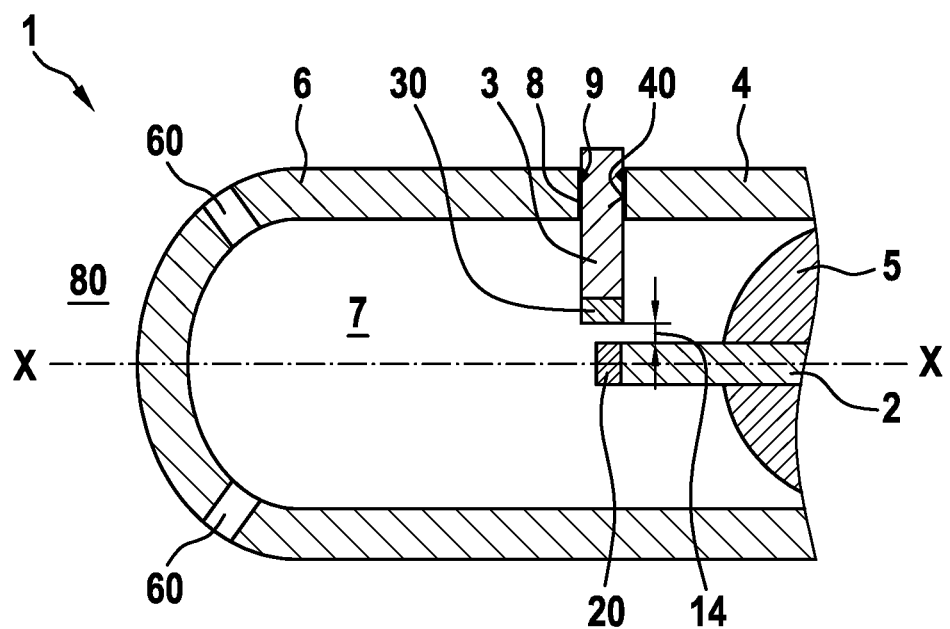
FIG. 6 shows a schematic sectional view of a prechamber spark plug according to a second preferred exemplary embodiment of the present invention.

FIG. 6 shows a prechamber spark plug 1 according to a second preferred exemplary embodiment of the present invention. Identical or functionally identical parts bear the same reference numbers as in the first exemplary embodiment.

In contrast to the first exemplary embodiment, in the second exemplary embodiment the housing 4 and the cap 6 are configured as a one-piece component. In this way, there is no need for a weld joint or other type of connection between the cap and the housing. In particular, this can significantly reduce manufacturing costs. Thus, in the manufacture of the prechamber spark plug, the method of adjusting the electrode spacing may be performed as a last step in the manufacture of the prechamber spark plug. A measurement of the electrode spacing may be made by the method according to the present invention from outside of the prechamber spark plug. A fastening of the ground electrode to the one-piece housing-cap component may be accomplished using a weld joint from the outside of the prechamber spark plug. In this case, thermal input to the ground electrode is very low, such that the adjusted spacing 14 does not change as a result. If fastening of the ground electrode without a thermal method is desired, the ground electrode may be implemented using a caulking process or the like on the one-piece housing-cap component, for example. Otherwise, this exemplary embodiment corresponds to the first exemplary embodiment, so that reference can be made to the description given therein.

The invention claimed is:
1. A prechamber spark plug, comprising:
a central electrode and a ground electrode arranged in a pre-chamber; and
a housing having a lateral hole;
wherein the ground electrode is arranged in the lateral hole in such a way that there is a gap area and a fastening area between the ground electrode and the housing, wherein the electrode spacing is determined by measuring a second spacing of a rear face of the ground electrode from an outer side of the housing such that the second spacing and the electrode spacing are equal.

2. The prechamber spark plug according to claim 1, wherein the gap area is a clearance fit between the ground electrode and the lateral hole.

3. The prechamber spark plug according to claim 1, wherein the fastening area is a weld joint.

4. The prechamber spark plug according to claim 1, wherein the fastening area is arranged radially further outward than the gap area.

5. The prechamber spark plug according to claim 1, wherein the central electrode is arranged perpendicular to the ground electrode.

6. The prechamber spark plug according to claim 1, wherein the ground electrode is cylindrical or is a polygon.

7. The prechamber spark plug according to claim 1, wherein the housing has a defined maximum roughness depth $R_{max}$ of $R_{max} \leq 10$ μm on an outer side, the roughness depth being adapted for sealing to a pressure generation unit.

8. The prechamber spark plug according to claim 1, wherein a cap and the housing are formed in a single piece.

9. A method of adjusting an electrode spacing between a central electrode and a ground electrode in the manufacture of a prechamber spark plug, comprising the following steps:
arranging the ground electrode in a lateral hole in a housing such that the ground electrode is arranged freely movably in the lateral hole;
positioning the ground electrode relative to the fixed central electrode at a predefined electrode spacing by moving the ground electrode in the lateral hole;
measuring the electrode spacing between central electrode and ground electrode; and
after adjusting the predefined electrode spacing, fastening the ground electrode in the lateral hole so that the predefined electrode spacing is maintained, wherein the electrode spacing is determined by measuring a second spacing of a rear face of the ground electrode from an outer side of the housing such that the second spacing and the electrode spacing are equal.

10. The method according to claim 9, wherein the ground electrode is fastened to the housing to an outer side of the housing, using a welding process in such a way that a fastening area and a gap area exist between the ground electrode and the lateral hole.

11. The method according to claim 9, wherein a clearance fit is provided in order to ensure the movability of the ground electrode in the lateral hole.

12. The method according to claim 9, wherein the arranging of the ground electrode in the lateral hole is done such that there is first contact between the ground electrode and the central electrode, and starting from a state of contact between the central electrode and the ground electrode, the ground electrode is moved radially outward.

13. The method according to claim 9, wherein the ground electrode is moved in the lateral hole by pneumatic pressure.

14. The method according to claim 9, wherein: i) a cap is fastened to the housing using a weld joint, before the electrode spacing is adjusted, or ii) the cap and the housing are formed in a single piece.

* * * * *